April 13, 1926.
F. J. PARKS
1,580,441
MACHINE FOR MAKING ENVELOPES
Filed Feb. 4, 1924   6 Sheets-Sheet 1
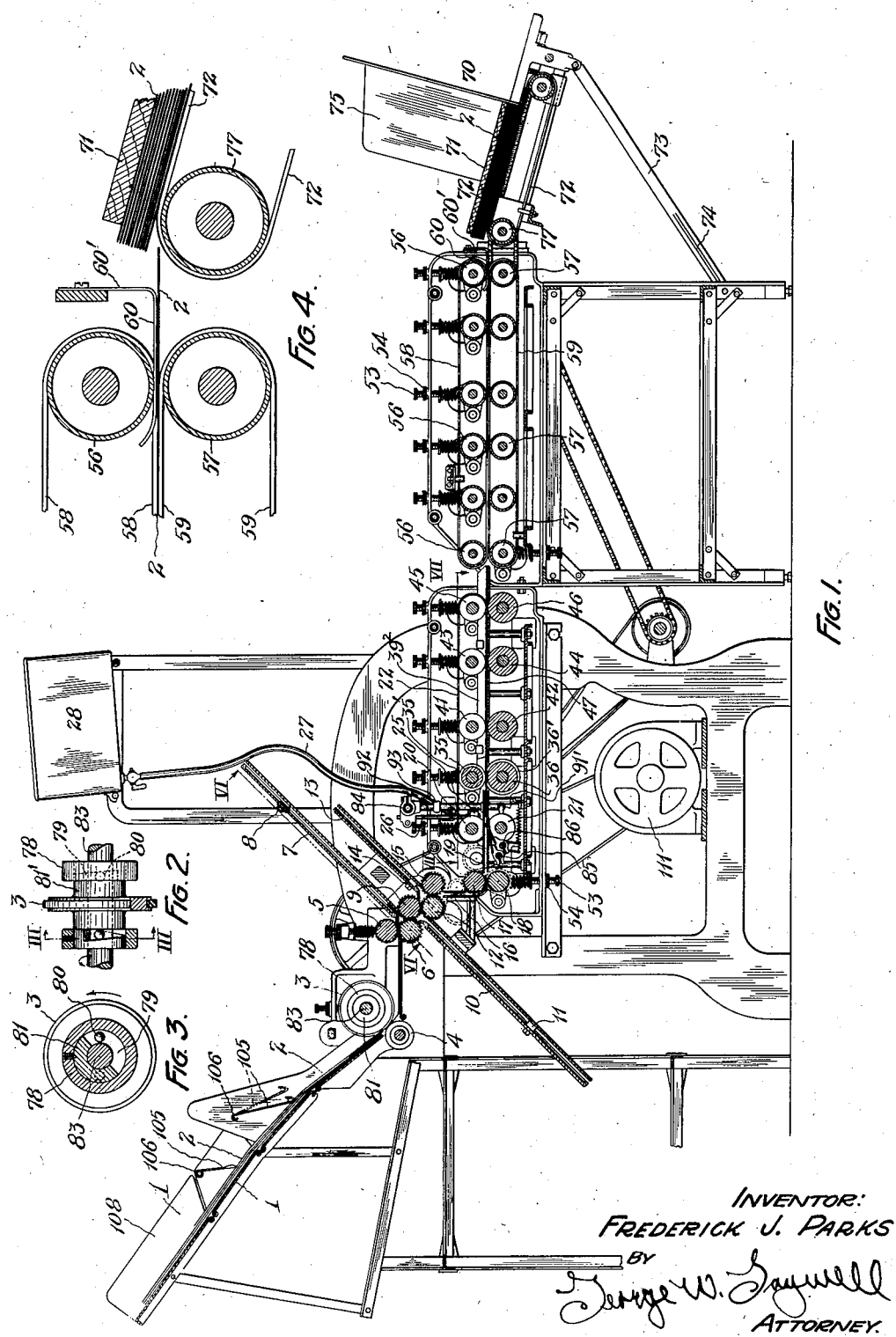
INVENTOR:
FREDERICK J. PARKS
BY
ATTORNEY.

April 13, 1926. 1,580,441
F. J. PARKS
MACHINE FOR MAKING ENVELOPES
Filed Feb. 4, 1924   6 Sheets-Sheet 2
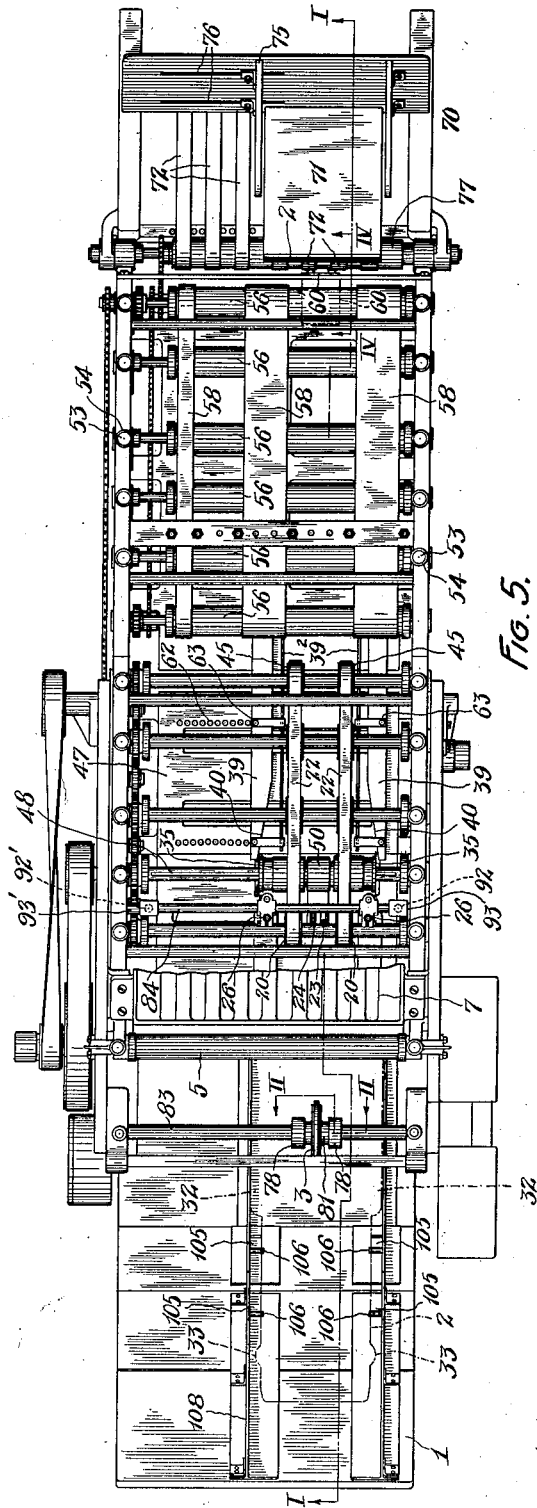
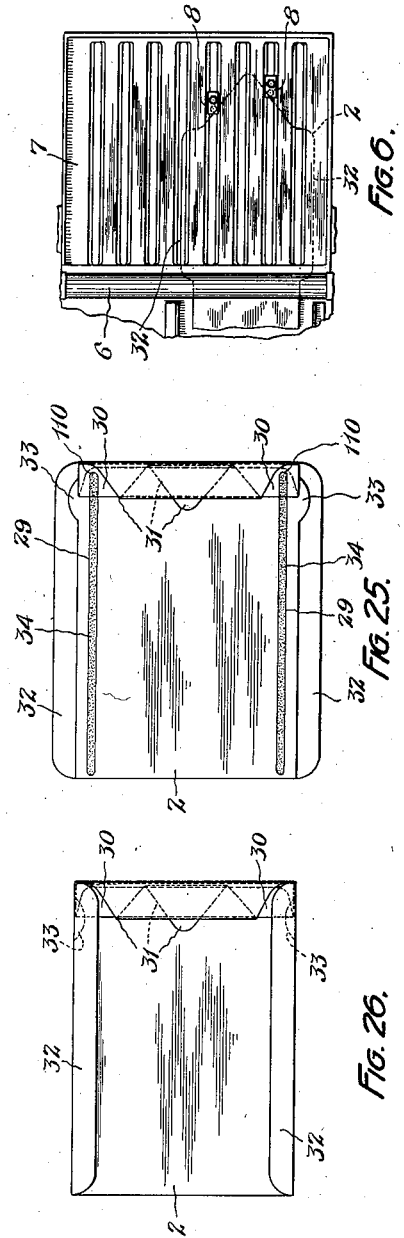
INVENTOR
FREDERICK J. PARKS
BY
ATTORNEY April 13, 1926.

F. J. PARKS 1,580,441

MACHINE FOR MAKING ENVELOPES

Filed Feb. 4, 1924

INVENTOR:
FREDERICK J. PARKS
BY
ATTORNEY.

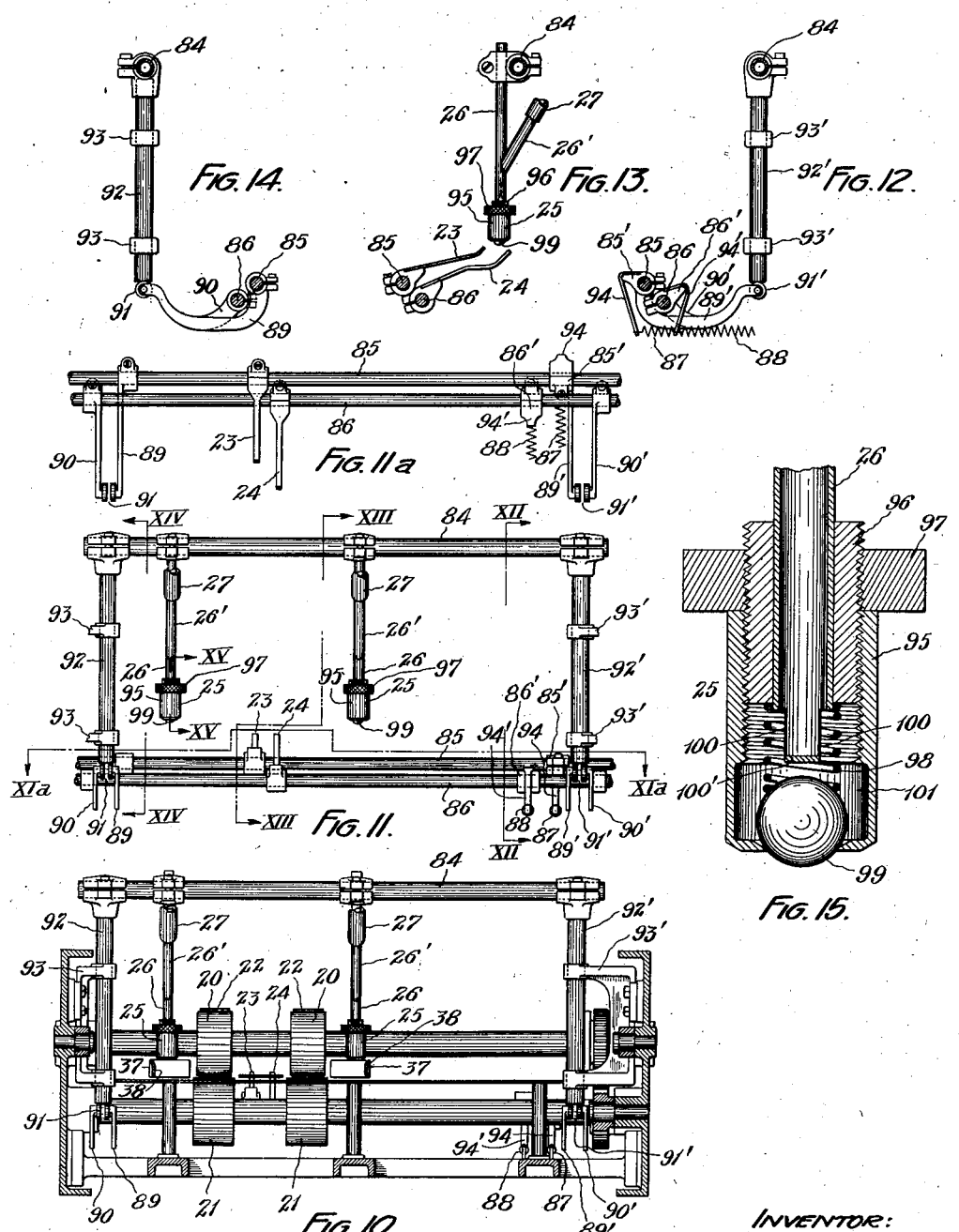

April 13, 1926. 1,580,441
F. J. PARKS
MACHINE FOR MAKING ENVELOPES
Filed Feb. 4, 1924 6 Sheets-Sheet 5
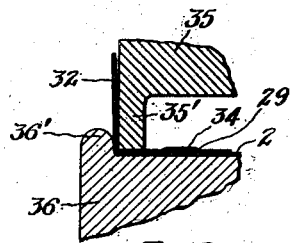
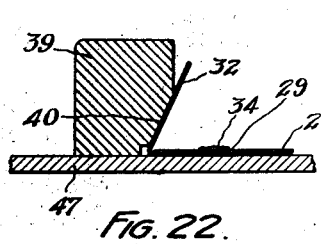
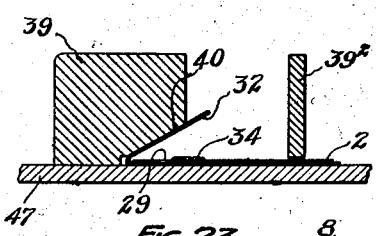
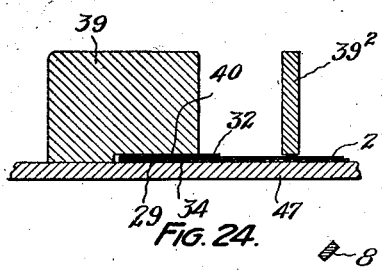
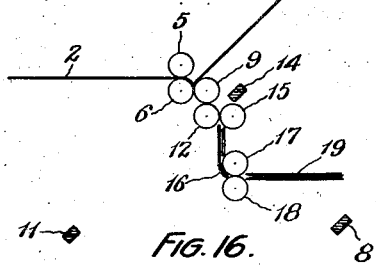
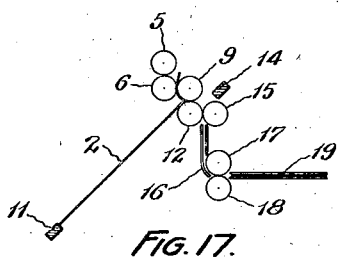
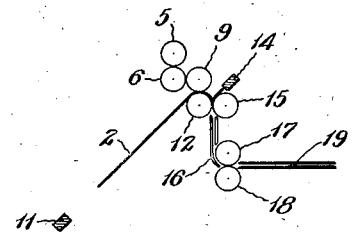
INVENTOR:
FREDERICK J. PARKS
BY
George W. Saywell
ATTORNEY April 13, 1926.

F. J. PARKS 1,580,441

MACHINE FOR MAKING ENVELOPES

Filed Feb. 4, 1924  6 Sheets-Sheet 6

INVENTOR
FREDERICK J. PARKS
BY George W. Saywell
ATTORNEY.

Patented Apr. 13, 1926.

1,580,441

UNITED STATES PATENT OFFICE.

FREDERICK JAMES PARKS, OF CLEVELAND, OHIO.

MACHINE FOR MAKING ENVELOPES.

Application filed February 4, 1924. Serial No. 690,423.

*To all whom it may concern:*

Be it known that I, FREDERICK J. PARKS, a citizen of the United States, resident of Cleveland, county of Cuyahoga, and State of Ohio, have invented new and useful Improvements in Machines for Making Envelopes, of which the following is a specification, the principle of the invention being herein explained and the best mode in which I have contemplated applying that principle, so as to distinguish it from other inventions.

My invention relates to machines for making envelopes and particularly to improvements in a machine of this character shown in U. S. Letters Patent No. 1,316,737 issued to me upon September 23, 1919. The invention particularly consists in new and improved means for conveying and guiding positively and in proper alinement the blank through the machine in which it is automatically folded and formed into a complete envelope; in new and improved means for gluing the blanks, so as to allow for the sealing of the side flaps and side tabs to the envelope body; in new and improved means for scoring said side flaps and turning the same in and over the envelope body; and in new and improved means for stacking the completed envelopes. Other improvements and incidental advantages will appear in the later detail description of the machine.

The annexed drawings and the following description set forth in detail certain means embodying my invention, such means disclosing, however, but one of the various forms in which the principle of the invention may be applied.
In said annexed drawings:

Figure 1 represents a longitudinal section of a machine embodying my improvements, taken in the planes indicated by the line I—I, Figure 5;
Figure 2 represents, upon an enlarged scale, a fragmentary transverse vertical section, taken in the planes indicated by the line II—II, Figure 5;

Figure 3 represents a longitudinal vertical section, taken in the plane indicated by the line III—III, Figure 2;

Figure 4 represents, upon an enlarged scale, a fragmentary longitudinal vertical section, taken in the plane indicated by the line IV—IV, Figure 5;

Figure 5 represents a plan view of the machine, parts of certain folding-device guides, and the glue reservoir and pipes leading therefrom being omitted;

Figure 6 is a fragmentary elevation, taken from the plane indicated by the line VI—VI, Figure 1;

Figure 10 is a transverse vertical section, taken in the planes indicated by the line X—X, Figure 8;

Figure 11 is an elevation of the gluing devices and the means directly acting to move the same toward and from the position in which they apply the glue to the lateral edges of the envelope body;

Figure 11[a] is a plan section, taken in the planes indicated by the line XI[a]—XI[a], Figure 11;

Figures 12, 13 and 14 represent fragmentary elevations taken, respectively, from the planes indicated by the lines XII—XII, XIII—XIII and XIV—XIV, Figure 11;

Figure 15 represents, upon an enlarged scale, a fragmentary longitudinal vertical section, taken in the plane indicated by line XV—XV, Figure 11;

Figure 7:
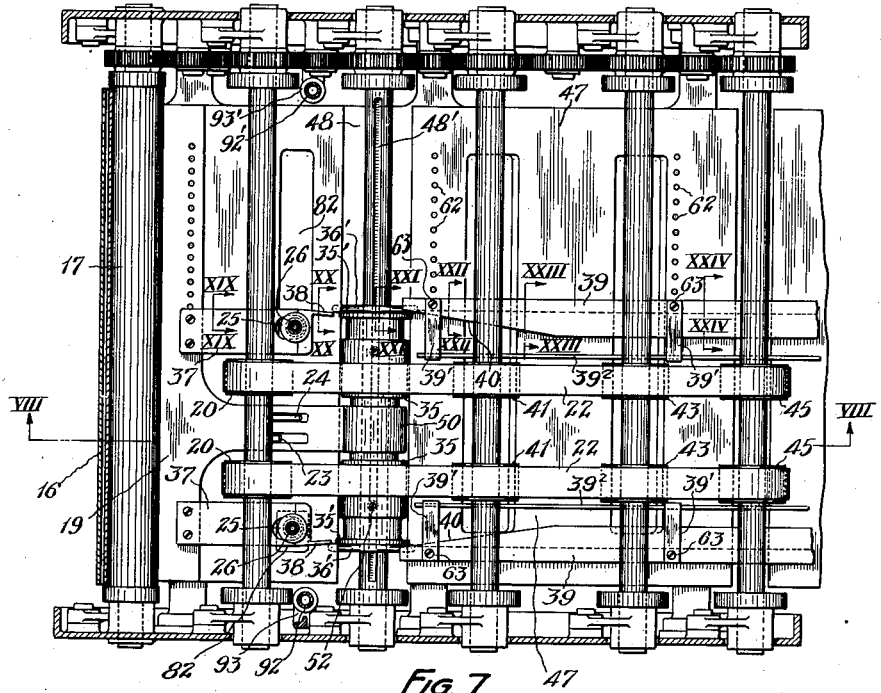
Figure 7 is a fragmentary plan section, upon an enlarged scale, taken in the plane represented by the line VII—VII, Figure 1;
Figure 27:
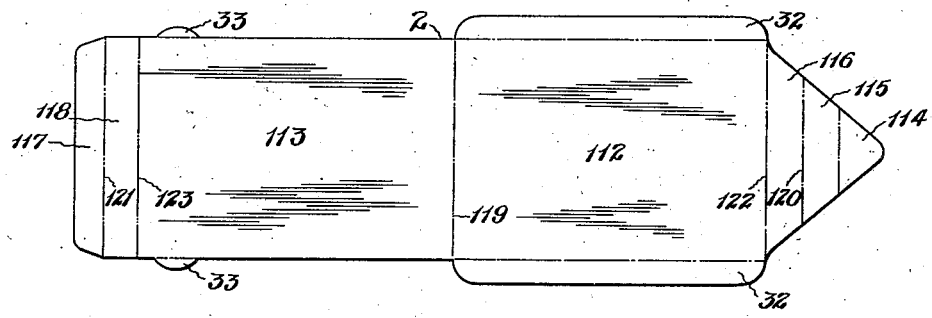
Figure 28:
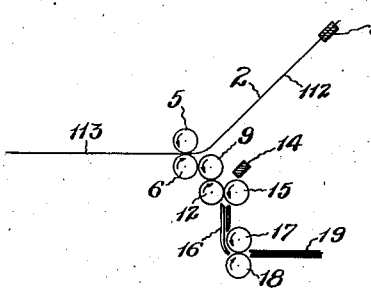
Figures 29, 30:
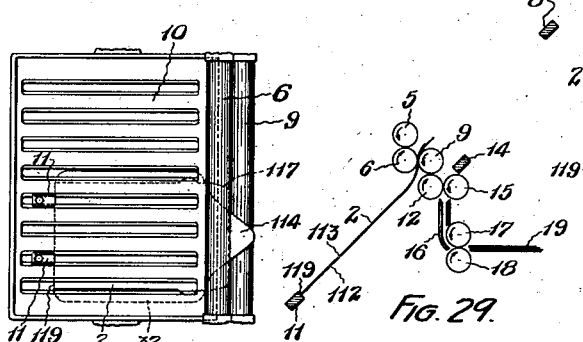
Figure 31:
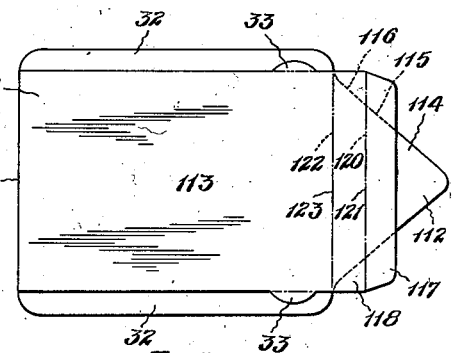
Figures 32, 33:
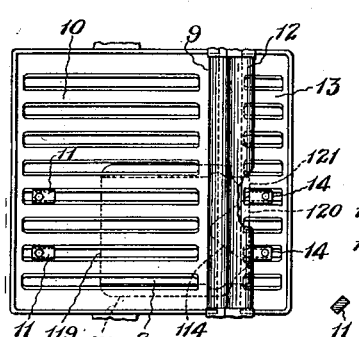
Figure 34:
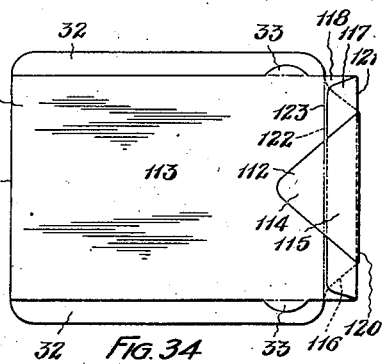

Figures 16, 17 and 18 are diagrammatic representations of the three folding operations to which the envelope blank is initially subjected, resulting in the formation of a detachably interlocked pocket and pull-out clasp, as shown in Figure 25;

Figures 19, 20, 21, 22, 23 and 24 represent, upon an enlarged scale, fragmentary transverse vertical sections, taken in the planes indicated respectively by the lines XIX—XIX, XX—XX, XXI—XXI, XXII—XXII, XXIII—XXIII and XXIV—XXIV, Figure 7, showing various successive steps in the creasing of the blank which has been folded by the devices shown in Figures 16, 17 and 18, the application of glue thereto, and the turning of the side flaps and side tabs of said blank over upon the body of the envelope and the two-ply pocket, to form a complete envelope, as shown in Figure 26, which is then subjected to the pressing and stacking operations performed by other elements of the machine which are completely shown in other figures and will be hereinafter fully described;

Figure 25 represents a plan view of the envelope blank as it emerges from the folding devices diagrammatically shown in Figures 16, 17 and 18;

Figure 26 represents a plan view of the completely folded and glued envelope as it passes from the operation indicated in Figure 24;

Figures 27 to 34, inclusive, represent in detail a certain structure of the envelope blank, and the operation of certain buckling stops and rolls, and the successive structures of the envelope guided thereby, all supplementary to and explanatory of various structures and operations represented by Figures 6, 16, 17, 18, 25 and 26. Of these figures, 27 to 34, inclusive, Figure 27 represents a plan view of the envelope blank; Figure 28 is a diagrammatic sectional view through the feed rolls, showing the blank in the position where it has been stopped and initially buckled for creating the first fold, this view corresponding with the position of the blank and the guide and stops shown in Figure 6; Figure 29 is a diagrammatic sectional view through the feed rolls, showing the blank at the completion of the first fold; Figure 30 is a plan view of the second set of guides, and the feed rolls, showing the blank in position against the stops of this guide, the view corresponding to that shown in Figure 29; Figure 31 is a plan view of the blank itself at the completion of the first fold thereof. The beginning of the second fold has already been shown in Figure 17 (as also the beginning of the first fold in Figure 16); Figure 32 is a diagrammatic sectional view through the feed rolls, showing the blank at the completion of the second fold; Figure 33 is a plan view of the second and third sets of guides showing the blank against the stops of the third set at the completion of the second fold; and Figure 34 is a plan view of the blank itself at the completion of the second fold. The beginning of the third fold has been shown in Figure 18, and the appearance of the blank at the completion of the third fold has been shown in Figure 25.

Referring to the annexed drawings, in which the several elements are indicated by the same respective ordinals in the different views, I indicate by the ordinal 1 a feed table from which envelope blanks 2 are fed successively through upper and lower peripherally engaging rolls 3 and 4 into the bight of rolls 5 and 6. Roll 4 is stationary and the engaging portion of rotating roll 3 has a rubber rim. Emerging from the rolls 5 and 6 the envelope is directed by an upwardly extending guide 7 until the front part of the envelope intersects the stops 8, Figure 6, which buckle the blank 2 substantially centrally of its ends and cause it to enter in doubled condition the bight of the rolls 6 and 9, Figure 1, whence emerging from which it follows the guide 10 until stops 11, Figure 17, buckle it adjacent its doubled rear end into the bight of the rolls 9 and 12, whence emerging from which it is conducted by the guide 13, Figure 1, until it is the third time buckled by the stops 14, this third buckling operation being adjacent the then forward end of the doubled blank and causing the blank to enter the bight of the rolls 12 and 15, Figure 18, whence it emerges in the form shown in Figure 25. Some detail illustration of the blank and the structure and operation of the feed rolls and guides and buckling stops is shown in Figures 27 to 34, inclusive. It will be noted therein that the blank 2 comprises a substantially rectangular portion 112 and a narrower substantially rectangular portion 113, each of these portions being formed with terminal portions, which, as fully described later, are adapted to be conjointly folded, the portion 112 being considered the front of the blank 2 and the portion 113 being considered the rear, these two portions being transversely folded upon one another in the plane 119 to create a bottom closure for the completed envelope. The ends of the two portions 112 and 113 are twice transversely folded, in the planes 120—121 and 122—123, respectively, as will be hereinafter fully described. The lateral extensions 32 of the front blank portion 112 are turned in and sealed down upon the rear of the back portion 113 to form envelope side closures, as will be hereinafter fully described. The transverse folding of the blank 2 is effected by certain feed rolls 5, 6, 9, 12 and 15, in combination with a plurality of pairs of guides 7, 10 and 13, having respective sets of stops 8, 11 and 14, which will now be described. These guides 7, 10 and 13, plainly shown in Figures 6, 30 and 33, are in inclined pairs spaced apart from each other transversely of the machine, providing a throat or passage therebetween for the travel of the blank, adjustable stops 8, 11 and 14, respectively, being provided in these passages which intercept the forward edge of the blank or folded blank to buckle the same and initiate a movement of the blank to the bight of a succeeding pair of feed rolls. The blank 2 is fed by the rolls 5 and 6 into the channel of the guides 7 until the sides of the forward terminal portion are intercepted by the stops 8 which buckles the blank in the plane 119, as shown in Figure 28, causing the blank to be fed into the bight of the rolls 6 and 9, as shown in Figure 16, the blank thus being fed into the channel of the guide 10 to the position shown in Figures 29 and 30, by which time the blank has been folded into the condition shown in Figure 31. The bottom edge 119 of the blank is intercepted by the stops 11 in the guides 10 so that the blank is buckled, as shown in Figure 29, in the planes 120 and 121 of the two terminal portions, the blank being fed into the bight of the rolls 9 and 12, as plainly shown in Figure 17, whence it emerges into the channel of the guides 13 and is fed therein until intercepted by the stops 14, as shown in Figures 32 and 33, the blank then being folded into the condition shown in Figure 34. The stops 14 cause the blank to be buckled in the planes 122 and 123 of the two terminal portions and fed into the bight of the rolls 12 and 15, as plainly shown in Figure 18, whence emerging, the blank has received its third fold and is in the condition shown in Figure 25. The blank 2 is then conducted downwardly by the guide 16 and into the bight of the upper and lower peripherally engaging rolls 17 and 18 whence emerging from which it is conducted into the guide 19 which leads it to certain scoring and gluing devices which will now be described in detail.

Figure 8:
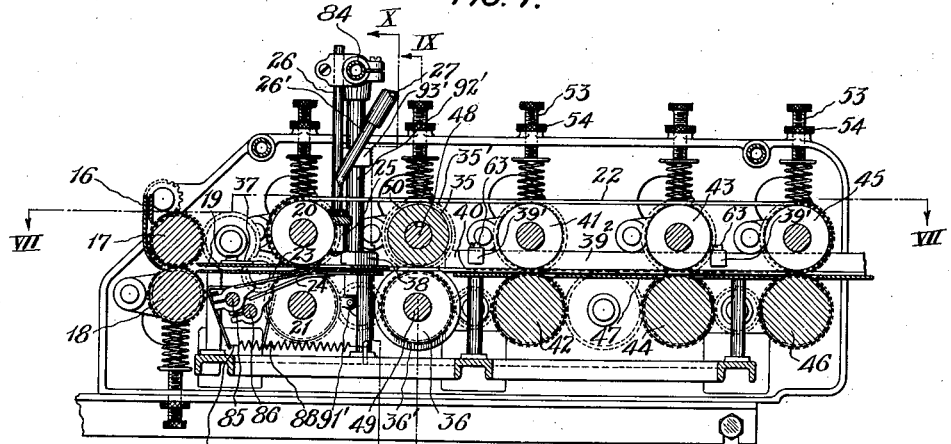
Figure 8 is a fragmentary longitudinal vertical section, taken in the plane indicated by the line VIII—VIII, Figure 7.
Figure 9:
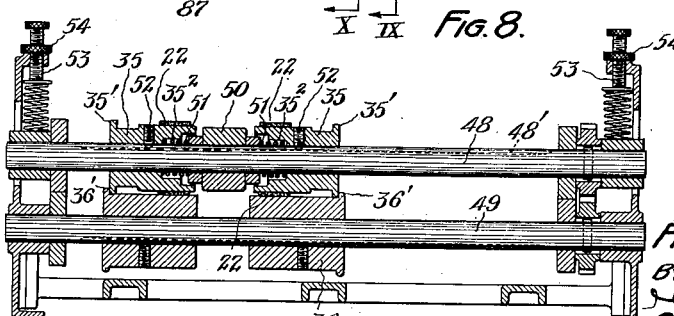
Figure 9 is a transverse vertical section, taken in the plane indicated by the line IX—IX, Figure 8.

Upon entering this scoring, gluing and side-folding section of the machine, the partially completed envelope shown in Figure 25 passes between two pairs of upper and lower rolls 20 and 21, being further positively conveyed by a pair of endless belts 22 which travel around said rolls 20 and other upper rolls 35, 41, 43 and 45, hereinafter fully described. Upon emerging from the bight of the rolls 20 and 21, the forward edge of the envelope intersects in succession a pair of triggers or trip devices 23 and 24, Figure 8, located intermediate the longitudinal vertical planes in which the two sets of said rolls 20 and 21 are located, as plainly shown in Figure 7. The detail operation of these trip devices 23 and 24 will be described hereinafter. Immediately following the intersection of the trip device 24 by the forward end of the blank, the lateral edges of the latter are furnished with a narrow band of glue 34 from ball-valve gluing devices 25, plainly shown in Figures 11 and 15, said gluing devices being adjustably suspended from a bar 84 by means of tubular depending members 26 having tubular upwardly extending arms 26′ communicating with flexible pipe conductors 27 fed from a glue reservoir 28. The detail construction and operation of the gluing device 25 will be hereinafter described. The portions of the blank which receive the glue in the form of a narrow ribbon as the envelope passes under the gluing devices 25 are indicated by the ordinal 29, the two-ply pocket which also receives glue adjacent its ends is indicated by the ordinal 30, and the pull-out tab which is detachably interlocked with the pocket 30 is indicated by the ordinal 31, Figure 25. The envelope is next scored to define said side flaps 32 which will next be folded inwardly and down upon the glued envelope portions 29 to form the side closures of the complete envelope. Special side tabs are indicated by the ordinal 33, which also are turned inwardly and sealed to form an envelope of the character described and claimed in my pending application for U. S. Letters Patent Serial No. 668,200, filed Oct. 12, 1923. The afore-mentioned scoring of the blank to define the side flaps 32 is effected by two pairs of rolls 35 and 36, the upper rolls 35 of which have flanges 35′ closely registering within flanges 36′ formed upon the lower rolls 36, Figure 9. In order that the side flaps 32 may not be bent inwardly by the scoring operation further than the position shown in Figure 20, I provide a pair of plates 37, Figure 7, beneath which the blank travels, said plates having inner upwardly extending flanges 38, Figure 20, preventing the turning in of the side flaps 32 before said side flaps are restrained by the side faces of the flanges 35′ of the rolls 35, Figure 21. These flanges 35′ hold the side flaps in this position until the completion of the scoring operation and until said side flaps 32 intersect the beveled faces 40 of a pair of turning knives 39, Figures 7 and 22, which progressively turn down the side flaps 32, Figure 23, until they are finally sealed down upon the envelope portions 29 and the glue 24. Further sealing is effected by two sets of upper rolls 41, 43 and 45 and respective cooperating lower rolls 42, 44 and 46, the envelope being conveyed over the plate 47 by the endless belts 22.

The envelopes are next conveyed by means of a pair of endless belts 58 and 59 between a series of cooperating upper and lower rolls 56 and 57, an outwardly extending guide 60 being provided intermediate the last rolls 56 and 57 under which the envelope passes on to a series of endless belts 72 traversing rolls 77 and are stacked, as shown, in a container 70. The container 70 is provided with a weight 71 supported upon the body of stacked envelopes, the latter being fed into the stacker 70 beneath the piled envelopes already assembled therein. By means of support 73 formed with slots 74 the inclination of the stacker 70 can be adjusted, the adjustment being such that the envelopes directed by the guide 60 are fed into the stacker 70 so that the forward edge of the envelope will strike upwardly beneath the projecting edge of the envelope last entered and thence will follow under said last-mentioned envelope and be conveyed by the belts 72 to the position shown in Figure 1.

The guide 60 is formed with an upwardly projecting flange 60' by which it is supported by the machine frame.

The machine is designed to accommodate blanks of varying widths and the adjustments provided for this accommodation will now be described. The side frame 108 of the feed table 1 is laterally adjustable; the left hand rolls 20, 41, 43 and 45, are adjustably secured; and the stacker plate 75 is adjustable laterally of the stacker frame through the medium of slots 76. In so far as the turning knives 39 are concerned, the same are secured by means of bolts 63, Figure 7, to the frame of the machine, the longitudinal alinement of the knives being assured by means of straps 39' secured to an aligning member $39^2$, the bolts 63 intersecting said straps 39'. By means of a series of transversely alined holes 62 formed in the frame, the left hand knife 39 can be adjusted. In so far as the scoring rolls 35 and 36 are concerned, the upper rolls 35 are adjustably secured to a transverse shaft 48, by means of pins 52 and a keyway 48' formed in said shaft 48, said rolls 35 being spaced apart by an intermediate roll 50 of desirable size through the medium of springs 51 contained with recesses $35^2$ formed in the opposite face of the rolls 35. These resilient spacing means between the rolls 35 allow for the accommodation of the thickness of the envelope between the flanges 35' and 36' during the scoring operation. The rolls 36 are adjustably secured to a second transverse shaft 49. In order to accommodate the envelopes when passing between any of the cooperating parts of the aforementioned rolls, the shafts to which the latter are secured are resiliently mounted in the frame in yielding bearings pressed downwardly by means of springs whose tension is adjusted by screws 53, the desired adjustment being fixed by means of lock nuts 54, Figure 9.

In order to insure an accurate feeding of the blank 2 to the rolls 3 and 4 and particularly to prevent the rear narrower half of the blank from skewing I provide the depending pivotally mounted weights 105, Figures 1 and 5, whose pivotal axes 106 extend inwardly from both sides of the feed table 1, these weights 105 being provided in any desired number, two to each side being shown, for illustration, extending down laterally adjacent the narrow half of the blank to confine the same.

Referring to the detail of the particular apparatus shown in the accompanying drawings for applying the glue, it will be noted, Figures 10 to 15, inclusive that the pair of valve controlled mechanisms 25 depend from vertical tubular supports 26 secured to a transverse tubular arm 84 supported at its ends by means of a pair of columns 92 and 92' vertically movable in frame guide brackets 93 and 93' and supported by means of angular arms 89 and 89' and 90 and 90' pivotally mounted at one end upon transverse shafts 85 and 86, respectively, rotatively mounted in the frame work of the machine. The actual connection of the arms 89, 89', 90 and 90', with the columns 92 and 92' is through the medium of two pairs of rollers 91 and 91' mounted upon the free ends of the arms 89—90, and 89'—90' respectively, said rollers 91 and 91' being normally held up against the lower ends of the columns 92 and 92' so as to hold said columns in their uppermost position through the medium of springs 87 and 88 secured to straps 94 and 94' which in turn are secured to lugs 85' and 86' secured adjacent one end of the shafts 85 and 86 respectively, the other ends of said springs 88 being secured to the frame work of the machine. It will be noted in Figure 13 that the trip fingers 23 and 24 are secured to the shafts 85 and 86 respectively. When the envelope blank intersects the trip 23 and depresses the same, it causes the shaft 85 to rotate slightly, thus lowering arms 89 and 89' and their attached rollers against the tension of spring 87. This action does not, however, permit the columns 92 and 92' to drop because they are held up by the arms 90 and 90' under the tension of the spring 88. However, when the envelope also intersects the trip 24, it rotates shaft 86 and lowers arms 90 and 90' thereby allowing the columns 92 and 92' to fall by their own weight which results in raising the ball valve 99, Figure 15, when said valve strikes the envelope blank, allowing glue to be deposited upon the lateral edges 29 of the blank from a chamber 101 formed in the valve casing 95. The portion of the envelope blank which initially receives the glue is a part of the two-ply pocket 30 and lies approximately in the position indicated by "110", Figure 25. When the partially folded blank has passed the trigger 23 so as to release the latter and permit the arms 89 and 89' to swing upward under the tension of spring 87, the columns 92 and 92' are raised, thereby stopping the flow of glue. It will be understood that the aforementioned construction allows for application of glue to envelope sections somewhat less in length than the length of the blank which passes under the triggers 23 and 24, according to the amount by which said triggers are spaced from each other. As will be noted in Figure 15 the valve casing 95 is internally threaded to receive an externally threaded annular bushing 96 into which depends and is secured, the conductor 26, the latter having lateral portions 100 of its wall cut away and its bottom end closed by wall 100' so as to allow the lateral flow of glue from the conductor 26 into the chamber 101 formed in the casing 95 whence the same feeds by the valve 99 when the latter is opened by contact with the blank 2. The valve 99 is normally held in closed position by means of a spring 98 and the casing 95 is covered by an internally threaded nut cooperating with a portion of the annular member 96 and forming a cap 97. Holes 82, Figure 7, are provided in the blank guides beneath the gluing devices 25 so that any leakage or dripping of glue will not foul the operating mechanism or subsequent envelope blanks. The left hand hole 82, Figure 7, is elongated to allow for adjustments necessary for blanks of varying widths. Standard means are provided for driving the afore-mentioned mechanisms in properly coordinated relations from the motor 111 including means for conveying the blank 2 progressively faster, as desired, as the same approaches the delivery end of the machine.

In order more accurately to insure the proper feeding of the blank 2, I provide means whereby the blank may be pulled by the rolls 5 and 6 faster than it is fed by the roll 3, as the latter is turned by the shaft 83. By reason of this construction the blank is held taut and thus much of the tendency of the blank to skew sideways is obviated. In order to preserve the cooperative relation of the driving means between the roll 3 and the rolls 5 and 6, I rotatably mount the roll 3 upon the shaft 83 which is driven from the motor 111 in any suitable manner, and in the direction indicated in Figures 2 and 3. The roll 3 is provided with two hub portions 81'. Adjacent these hub portions 81' two annular members 81 peripherally lined with annular covers 78 are secured to the shaft 83, the inner face portions of which adjacent to the hub members 81' are formed with cam grooves 79 within which are located balls 80. From the preceding description and an inspection of Figures 2 and 3, it will be evident that the rotation of the shaft 83 in the direction indicated will cause the rotation of the roll 3 through the medium of the cam grooves 79 and the balls 80, and thus feed the blank 2 at the desired speed. It is also evident that when the blank 2 is caught by the rolls 5 and 6 and thus fed faster than it is fed by the roll 3, the latter will turn forward upon the shaft 83, being free so to do by reason of the release of the same from the balls 80 contained in the cam grooves 79.

What I claim is:

1. In means for automatically manufacturing envelopes, the combination with folding devices operable transversely to fold a blank; of means for applying glue to the lateral edges of the folded blank, cooperative rolls having resiliently interlocked flanges for scoring the blank adjacent within the glued edges, means temporarily limiting the turning movement of the scored edges, means for sealing said edges to provide side closures, and cooperative means for conveying the blank to said folding, gluing and sealing devices.

2. In means for automatically manufacturing envelopes, the combination with folding devices operable transversely to fold a blank; of means for applying glue to the lateral edges of the folded blank, cooperative rolls having resiliently interlocked flanges for scoring the blank adjacently within the glued edges, horizontal plates adjacently rearward of said scoring rolls beneath which said folded blank is fed, said plates having vertically extended flanges limiting the turning movement of the scored edges rearwardly of said scoring rolls, means for progressively turning down said scored edges and sealing the same to provide side closures, and cooperative means for conveying the blank to said folding, gluing and sealing devices.

3. In means for automatically manufacturing envelopes, blank folding means; blank gluing means, including a pivoted trip adapted to intercept the blank and be moved thereby; means tending to hold said trip in non-operative gluing position; glue-feeding means including a ball-valve adapted to be opened by contact with the blank; means normally holding the valve up out of contact with the blank; means rendering said last-mentioned means inoperative and permitting the valve to lower by gravity and feed glue when and because said trip is moved by said blank; and cooperative means for conveying the blank to said folding and gluing devices.

4. In means for automatically manufacturing envelopes, blank folding means; blank gluing means, including a pivoted trip adapted to intercept the blank and be moved thereby; means tending to hold said trip in non-operative gluing position; glue-feeding means including a ball-valve adapted to be opened by contact with the blank; means normally holding the valve up out of contact with the blank; a shaft to which said trip is secured, said holding means being secured to said shaft and being turned out of operative position, thus permitting the valve to lower by gravity and feed glue, when the shaft is turned by the movement of said trip caused by the blank; and cooperative means for conveying the blank to said folding and gluing devices.

5. In means for automatically manufacturing envelopes, blank folding means; blank gluing means controlled by the movements of the blank and including a pair of longitudinally spaced pivoted trips adapted to intercept the blank and be moved thereby; means tending to hold said trips in non-operative gluing position, the glue commencing to feed when both trips are moved by the blank and ceasing to feed when the first trip is released by the blank; and cooperative means for conveying the blank to said folding and gluing devices.

6. In means for automatically manufacturing envelopes, folding devices operable transversely to fold a blank; blank gluing means controlled by the movements of the blank and including a pair of longitudinally spaced pivoted trips adapted to intercept the blank and be moved thereby; means tending to hold said trips in non-operative gluing position, the glue commencing to feed when both trips are moved by the blank and ceasing to feed when the first trip is released by the blank; means for sealing said blank to form envelope side closures; and cooperative means for conveying the blank to said folding, gluing and sealing devices.

7. In means for automatically manufacturing envelopes, folding devices operable transversely to fold a blank; means for applying glue to the lateral edges of the folded blank; means for sealing said edges to provide side closures; and cooperative means for conveying the blank to said folding, gluing and sealing devices, including progressive edge-folding means, and conveying and sealing means comprising a series of cooperative upper and lower rolls, an endless belt traversing said upper rolls, a plate over which the blank is conveyed adjacent below the lower path of travel of the belt, and a second series of cooperative upper and lower rolls, and two series of endless belts traversing said last-named rolls, respectively, and conveying the blank between their adjacent lengths.

Signed by me this 22nd day of January, 1924.

FREDERICK JAMES PARKS.